United States Patent [19]

Dalgoutte

[11] 4,220,398
[45] Sep. 2, 1980

[54] JEWELED OPTICAL FIBER CONNECTOR

[75] Inventor: David G. Dalgoutte, Ilkley, England

[73] Assignee: International Standard Electric Corporation, New York, N.Y.

[21] Appl. No.: 969,638

[22] Filed: Dec. 14, 1978

[30] Foreign Application Priority Data

Dec. 22, 1977 [GB] United Kingdom ............... 53435/77

[51] Int. Cl.² .............................................. G01B 5/14
[52] U.S. Cl. .................................................. 350/96.21
[58] Field of Search ........................... 350/96.21, 96.22

[56] References Cited

U.S. PATENT DOCUMENTS

| 3,825,320 | 7/1974 | Redfern | 350/96.22 |
| 4,158,477 | 6/1979 | Phillips | 350/96.21 |

FOREIGN PATENT DOCUMENTS

| 2750089 | 5/1978 | Fed. Rep. of Germany | 350/96.21 |
| 7807401 | 1/1979 | Netherlands | 350/96.21 |

Primary Examiner—Rolf G. Hille
Attorney, Agent, or Firm—John T. O'Halloran; Peter C. Van Der Sluys

[57] ABSTRACT

A glass sleeve has a bore that, at its ends, provides a clearance fit around optical fibres to be coupled with said bore tapering inwardly to a link piece of glass optical fibre having the same cross-section as that of the fibres to be coupled and unto which the wall of the glass sleeve has been collapsed over substantially the entire length of the link piece. The glass sleeve is retained within the central region of a tubular member by a pair of pierced watch jewels disposed at each end of the member and having apertures that provide a clearance fit around the fibres and are in axial alignment with the sleeve axis.

10 Claims, 2 Drawing Figures

JEWELED OPTICAL FIBER CONNECTOR

This invention relates to an optical fibre coupler assembly and is an improvement over the invention described and claimed in the commonly assigned U.S. Applications Ser. No. 845,812 filed Oct. 27, 1977 and Ser. No. 925,266 filed July 17, 1978.

That specification describes a coupler which is made by positioning in the bore of a glass sleeve a link piece of glass optical fibre that has the same cross-section as two fibres to be joined by the coupler, and then collapsing the bore around the link piece. The link piece is shorter than the sleeve and is positioned so that the sleeve extends beyond both its ends. The collapse process is carefully controlled so that it proceeds over substantially the whole of the length of the link piece while leaving the portions of the sleeve bore beyond its end large enough to accommodate the ends of the fibres to be joined.

If the initial size of the bore is only slightly larger than the external diameter of the fibres that are to be inserted then it is convenient to have some form of guiding jib that will facilitate their insertion. U.S. Pat. No. 3,870,395 shows a connector having elastic end sleeves with a conical bore, the inner end of which frictionally engages the outer surfaces of the fibers to resist fibre movement. The present invention is concerned with a guiding jig that itself forms part of the coupler.

According to the present invention, there is provided an optical fibre coupler for coupling a pair of plastics sheathed optical fibres, the coupler including a glass sleeve retained within the central region of a tubular member wherein the sleeve has a bore that at its ends is a clearance fit around the optical fibres to be coupled and tapers inwardly to a link piece of glass optical fibre that has the same cross-section as that of said fibres around and on to which the wall of the glass sleeve has been collapsed over substantially the entire length of the link piece in such a way as to leave the portions of the bore beyond the link piece ends large enough to accommodate the insertion of said fibres, wherein a pair of pierced watch jewels having apertures that are a clearance fit around the fibres and smaller than the entry apertures of the link piece are located in the tubular member at opposite ends of the sleeve with their axes aligned with the sleeve axis and with their oil cups outwardly facing, and wherein in the end regions of the tubular member beyond the jewels the member is provided with an enlarged bore.

Such a coupler is suitable for coupling fibres that have an internal guiding structure such as step index and graded index fibres. If the refractive index of the sleeve is less than that of the link piece such a coupler may also be used for coupling fibres which have no internal guiding structure, but instead rely upon the use of lower refractive index sheathing to provide the requisite guidance. This requirement to use a lower refractive index material for the sleeve can however be avoided by using a link piece that is provided with its own lower refractive index cladding. Under these circumstances the fibres (with no internal guiding structure) are matched in diameter with that of the core portion of the link piece. The heating of the sleeve to produce the required collapse is then taken slightly beyond the ends of link piece so as to produce a pair of constricted regions or throats where the bore diameter is substantially matched with that of the fibre.

Accordingly the invention also provides an optical fibre coupler for coupling a pair of plastics sheathed optical fibres that have no internal optical guiding structure, the coupling including a glass sleeve retained within the central region of the tubular member wherein the sleeve has a bore that is obstructed at a central region by a link piece of glass optical fibre that has the same numerical aperture or greater than that of the plastics sheathed fibres and has a lower refractive index region surrounding a core region having the same diameter as that of the fibres around and on to which link piece the wall of the glass sleeve has been collapsed over the entire length of the link piece wherein beyond each end of the link piece the bore of the sleeve is provided with a throat region just large enough to accommodate the insertion of one of said fibres, wherein a pair of pierced watch jewels having apertures that are a clearance fit around the fibres and smaller than the entry apertures of the sleeve are located in the tubular member.

There follows a description of a coupling between two optical fibres using a coupler that embodies the invention in a preferred form. Also described in a modified form of coupling. The description refers to the accompanying drawings in which.

Figure 1:
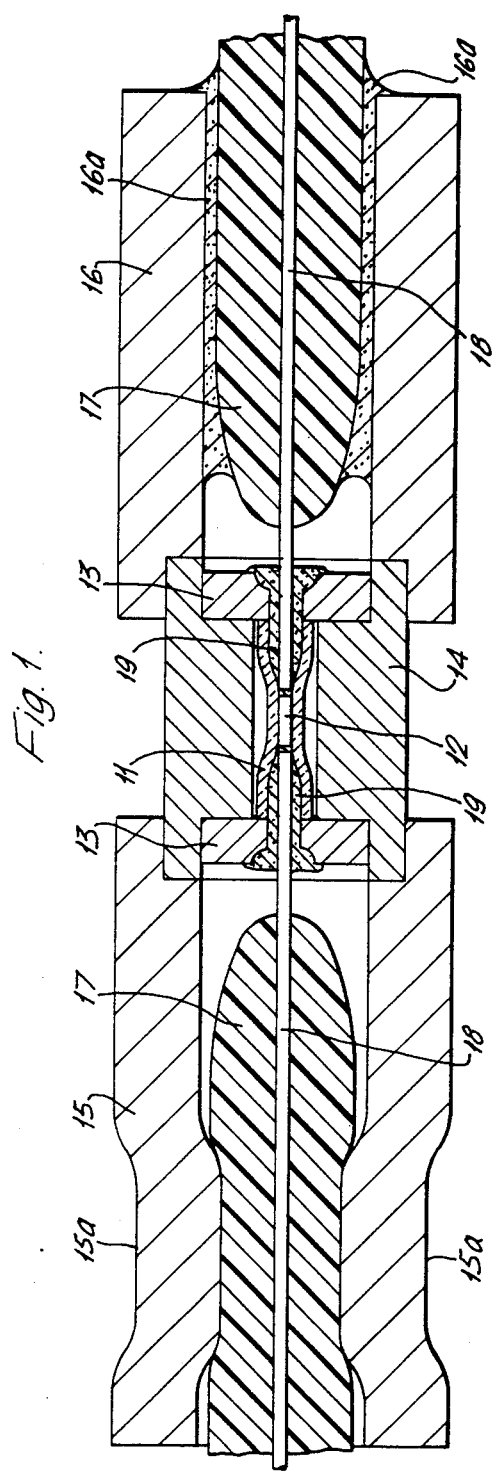
FIG. 1 depicts a longitudinal sectional view of the coupling.

Referring to FIG. 1 of the accompanying drawings the principal components of a coupler are a glass sleeve 11 containing a link piece 12 of optical fibre, two pierced watch jewels 13 and a tubular member which in this instance is made in three portions, a central portion 14 and two end portions 15 and 16.

The central region of sleeve 11 is softened by heat to cause it to collapse around and on to the link piece 12 in the manner that has been described above and that is described in greater detail in U.S. Application Ser. No. 845,812 to which attention is directed.

The central portion 14 of the tubular member has a bore in which the sleeve 11 is a sliding fit. The two ends of the central portion 14 are counterbored to receive the watch jewels 13 which are push-fitted into the ends with their oil cups facing outwardly. The jewel apertures are chosen to be smaller than the entry apertures of the sleeve so that there is an unobstructed passage from each jewel aperture in to each sleeve aperture. Secured to the central portion 14 are the two end portions 15 and 16 of the tubular member. These end portions have bores that are a sliding fit around the sheathing 17 of two plastics sheathed optical fibres 18.

The ends of the two fibres 18 having the same cross-section as the link piece 12 are exposed by stripping back the plastics sheathing 17 for a distance just sufficient to allow the bared ends to be inserted fully into the ends of the sleeve 11. The two ends of the sleeve are filled with a refractive index matching cement or liquid 19 and then the fibre ends are inserted. This insertion is relatively straightforward since the fibres are brought into approximately correct alignment by the engaging of the plastics sheathing in the bores of the end portions 15 and 16 of the tubular member. This alignment means that the fibre ends either pass straight through the jewel apertures or at least are sufficiently close to proper alignment for them to be engaged by the oil cups. In the latter instance the polish in the cups is sufficient for them to act as guides guiding the ends through the apertures and into the ends of the sleeve 11. Then when the fibres are fully inserted they are secured to the tubular member. This may be for instance by means of a crimp as depicted at 15a, or by means of a fillet 16a of cement.

If the fibres are secured by cementing the tubular structure may be made entirely of any hard plastics material with good machining properties such as acrylic resin. If the fibres are to be secured by crimping, then at least the end portions of the tubular structure will be made of a suitable metal such as steel. An advantage of using a transparent middle portion 4 is that it may then be possible to use an ultra-violet light curing adhesive for the cement 19.

In a typical coupling for graded index doped silica fibres having an external diameter of 120 μm and a plastics sheathing external diameter of 1.1 mm. the three portions of the tubular member are each approximately 1 cm long, and the tubular member has an external diameter of approximately 2.0 mm.

Figure 2:
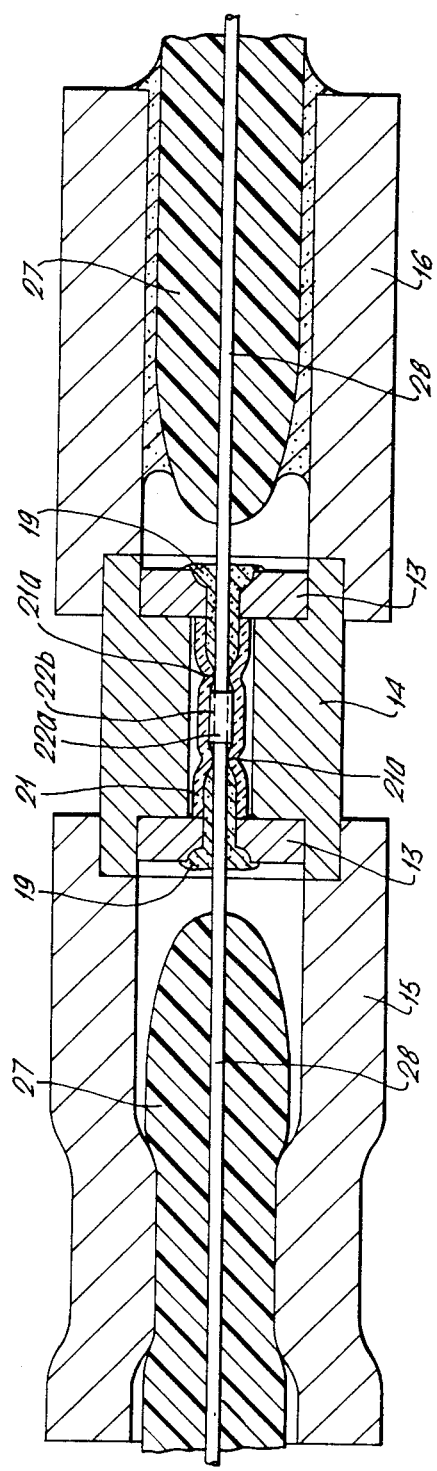
FIG. 2 depicts a longitudinal section view of a modified form of coupling.

The coupling depicted in FIG. 2 is very similar to that of FIG. 1. The differences arise because this second coupling is a coupling between a pair of optical fibres 28 that have no internal guiding structure, but instead rely upon the use of lower refractive index sheathing 27 to provide the requisite guidance. The link piece of this coupler has a core portion 22a surrounded by lower refractive index cladding portion 22b. The core portion 22a has the same diameter and the refractive indices of the two portions are chosen to give the line fibre the same numerical aperture as the two fibres 28. Since the external diameter of the link piece is greater than that of the fibres they will not be adequately located if in the regions beyond the ends of the link piece the bore diameter is allowed to remain over the whole length larger than the link piece diameter. For this reason the softening by heat of the sleeve is carried beyond the ends of the link piece so as to produce a pair of constrictions or throats 21a where the bore diameter is just sufficient to allow the fibres to be threaded through. The remainder of the coupler, that is the three portion tubular member 14,15 and 16 and the two pierced watch jewels 13, are the same as the equivalent components previously described with reference to FIG. 1.

Ideally the core and surrounding regions of the link piece should respectively have the same refractive indices as those of the fibres and their sheaths. This may not be convenient when the fibres and their sheaths have particularly low refractive indices. Under these circumstances the use of higher refractive index materials for the link piece is acceptable provided that the numerical aperture is as large or greater than that of the plastics clad fibres. There will be a slight reflection loss at the interfaces between the link piece and the fibres, but unless the mismatch of refractive index is large the reflection loss is minimal.

In the case of certain types of plastics sheathed glass fibre with no internal guiding structure there may be the further minor difference that, if the plastics sheathing has an inner part and an outer part readily separable from the inner part, the jewel apertures and the sleeve throats may be dimensioned to accept the inner sheathing. This may be advantageous when the fibres to be coupled are of the type that are provided with a thin plastics coating on line with their being drawn into fibre in order to protect the freshly prepared fibre surface, and then subsequently provided with a more substantial second protective coating.

What is claimed is:

1. An optical fibre coupler for coupling a pair of plastics sheathed optical fibres, the coupler including a glass sleeve retained within the central region of a tubular member wherein the sleeve has a bore that at its ends is a clearance fit around the optical fibres to be coupled and tapers inwardly to a link piece of glass optical fibre that has the same cross-section as that of said fibres around and onto which the wall of the glass sleeve has been collapsed over substantially the entire length of the link piece in such a way as to leave the portions of the bore beyond the link piece ends large enough to accommodate the insertion of said fibres, wherein a pair of pierced watch jewels having apertures that are a clearance fit around the fibres and smaller than the entry apertures of the link piece are located in the tubular member at opposite ends of the sleeve with their axes aligned with the sleeve axis and with their oil cups outwardly facing, and wherein in the end regions of the tubular member beyond the jewels the member is provided with an enlarged bore.

2. A coupler as claimed in claim 1 wherein the glass sleeve is retained in the tubular member by the jewels.

3. A coupler as claimed in claim 1, wherein at least a part of the tubular member is made of transparent material that allows the fibres to be secured within the sleeve with an ultraviolet light curing adhesive.

4. A coupler as claimed in claim 1, wherein the tubular member is formed in three parts comprising a middle part housing the sleeve and two end parts.

5. A coupler as claimed in claim 1, additionally including a pair of optical fibres each inserted in one end of said tubular member and having an end in juxtaposition with an end of said link piece.

6. An optical fibre coupler for coupling a pair of plastics sheathed optical fibres that have no internal optical guiding structure, the coupling including a glass sleeve retained within the central region of a tubular member wherein the sleeve has a bore that is obstructed at a central region by a link piece of glass optical fibre that has the same numerical aperture or greater than that of the plastics clad fibres and has a lower refractive index region surrounding a core region having the same diameter as that of the fibres around and onto which link piece the wall of the glass sleeve has been collapsed over the entire length of the link piece wherein beyond each end of the link piece the bore of the sleeve is provided with a throat region just large enough to accommodate the insertion of one of said fibres, wherein a pair of pierced watch jewels having apertures that are a clearance fit around the fibres and smaller than the entry apertures of the link piece are located in the tubular member.

7. A coupler as claimed in claim 6 wherein the glass sleeve is retained in the tubular member by the jewels.

8. A coupler as claimed in claim 6, wherein at least a part of the tubular member is made of transparent material that allows the fibres to be secured within the sleeve with an ultraviolet light curing adhesive.

9. A coupler as claimed in claim 6, wherein the tubular member is formed in three parts comprising a middle part housing the sleeve and two end parts.

10. A coupler as claimed in claim 6, additionally including a pair of optical fibers each inserted in one end of said tubular member and having an end in juxtaposition with an end of said link piece, said fibers being guided at their ends by the throat regions of the sleeve.

* * * * *